(12) United States Patent
Kranig et al.

(10) Patent No.: US 6,177,144 B1
(45) Date of Patent: Jan. 23, 2001

(54) BINDER AND ITS USE IN RADIATION-CURABLE COATING AGENTS

(75) Inventors: Wolfgang Kranig, Münster; Rainer Blum, Ludwigshafen, both of (DE)

(73) Assignee: BASF Coatings AG, Muenster-Hiltrup (DE)

( * ) Notice: Under 35 U.S.C. 154(b), the term of this patent shall be extended for 0 days.

(21) Appl. No.: 09/171,544

(22) PCT Filed: Mar. 24, 1997

(86) PCT No.: PCT/EP97/01484

§ 371 Date: Aug. 23, 1999

§ 102(e) Date: Aug. 23, 1999

(87) PCT Pub. No.: WO97/41184

PCT Pub. Date: Nov. 6, 1997

(30) Foreign Application Priority Data

Apr. 27, 1996 (DE) .............................. 196 16 984

(51) Int. Cl.$^7$ ................ C09J 7/04; C08F 2/50; C08G 63/52; C08L 67/00; C09D 167/07
(52) U.S. Cl. ............ 427/519; 427/517; 427/518; 427/520; 522/14; 522/35; 522/83; 522/85; 522/86; 522/134; 522/135; 522/141; 522/142; 522/905; 528/220; 528/229; 528/291
(58) Field of Search ............... 522/905, 35, 83, 522/85, 86, 14, 134, 135, 141, 142; 528/220, 229, 291; 427/519, 518, 517, 520

(56) References Cited

U.S. PATENT DOCUMENTS

| | | |
|---|---|---|
| 2,759,913 | 8/1956 | Hulse ................... 260/89.7 |
| 3,845,056 | 10/1974 | Robson et al. ........... 260/268 |
| 4,022,674 | 5/1977 | Rosen ................ 204/159.22 |
| 4,045,416 | 8/1977 | Robson et al. . |
| 4,100,047 | 7/1978 | McCarty . |
| 4,216,306 | 8/1980 | Boekeler . |
| 4,338,171 | 7/1982 | Barie, Jr. et al. . |
| 4,547,562 | 10/1985 | Nichols . |
| 4,675,374 | 6/1987 | Nichols . |
| 5,741,829 | * 4/1998 | Reich et al. ............ 522/35 |
| 5,859,084 | * 1/1999 | Schroder et al. ........ 522/34 |

FOREIGN PATENT DOCUMENTS

| | | |
|---|---|---|
| 23 46 424 C2 | 9/1973 | (DE) . |
| 26 25 538 C2 | 6/1976 | (DE) . |
| 195 45 123 C1 | 12/1995 | (DE) . |
| 0 379 377 B1 | 1/1990 | (EP) ............... C08G/73/10 |

OTHER PUBLICATIONS

N. Ogata and T. Asahara, Bull. Chem. Soc. Jap. 39 pp. 1486 to 1490, 1966.
F Möller, Houben–Weyl, vol. 11/1 (1957), pp. 277 to 280.

* cited by examiner

Primary Examiner—Susan W. Berman

(57) ABSTRACT

The present invention relates to a radiation-curable binder BM consisting of a copolymer which is composed of:
A) from 80 to 99% by weight of a hydroxyl-containing polyether acrylate and/or polyester acrylate A), which optionally contains a mono-, di- and/or polyamine AA) as adduct, and of
B) from 1 to 20% by weight of benzophenonetetracarboxylic acid, its anhydrides and/or its esters.

The invention additionally relates to processes for the preparation of the binder BM and to the use of the binders BM in radiation-curable coating compositions.

16 Claims, No Drawings

BINDER AND ITS USE IN RADIATION-CURABLE COATING AGENTS

FIELD OF THE INVENTION

The present invention relates to binders based on optionally amine-modified polyether acrylates and/or polyester acrylates, containing units of benzophenonetetracarboxylic acid, its anhydrides and/or its esters as polymeric photoinitiator constituents, and to the use of the binders in radiation-curable coating compositions.

BACKGROUND OF THE INVENTION

It is known to cure coatings based on acrylates by radiation, especially by UV radiation. However, the problem occurs here that the presence of air is disruptive in the full curing of the coating material.

DE-C 26 25 538 discloses photopolymerizable coating compositions which include amines as reducing agents and/or chain-transferring compounds.

By incorporating the amino group into a molecule which also contains polymerizable groups, an amine is obtained which is incorporated by polymerization in the course of curing.

A known method of incorporation is the addition of amines onto molecules rich in double bonds, a reaction which takes place by analogy with a Michael addition and which is described, for example, in F. Möller, Houben-Weyl, Vol. 11/1 (1957), pages 277 to 280. U.S. Pat. No. 2,759,913 teaches the addition of amines onto activated, olefinically unsaturated compounds, such as acrylates, in equimolar amounts, leading to the complete reaction of the activated ethylenic double bonds. Systematic investigations into the addition of amino alcohols onto acrylates have been carried out by N. Ogata and T. Asahara, Bull. Chem. Soc. Jap. 39, pages 1486 to 1490, 1966.

DE-C 23 46 424 describes the preparation of radiation-curable compositions starting from acrylic esters of polyhydric alcohols and from secondary, aliphatic monofunctional amines.

U.S. Pat. Nos. 4,547,562 and 4,675,374 disclose radiation-curable solvent-free compositions based on polyacrylates and on mono-, di- or polyamines. Di- and polyamines mentioned as being suitable are species having more than one primary amino group. When these polyamines are used, highly crosslinked coating compositions of relatively high molecular mass and thus relatively high viscosity are obtained which without the addition of reactive diluents and solvents have an excessive application viscosity or even lead to solid products.

Finally, U.S. Pat. No. 4,045,416 and U.S. Pat. No. 3,845,056 relate to radiation-curable coating compositions based on amine acrylates, which are obtained by reacting polyacrylates with amines having at least one amine hydrogen. Amines mentioned as being suitable are primary and secondary monoamines and also polyamines. In accordance with the U.S. patents, the polyamine components specified are polyamines having more than one primary amino group, polyamines having exclusively secondary amino groups, or polyamines having secondary and tertiary amino groups.

Coating compositions according to the as yet unpublished German Patent Application 195 45 123.6 are radiation-curable without the use of external synergists, for example amines. The coating compositions described in the as yet unpublished German Patent Application 195 45 123.6 contain oligomers of low viscosity having comparatively good radiation-curability and lead to comparatively good properties in the coating film, especially with respect to the hardness of the coating film. The coating compositions are of low viscosity, so that it is possible to avoid the use of reactive diluents and organic solvents. Furthermore, the coatings produced with such coating compositions couple good sandability with good adhesion, even on difficult substrates.

A disadvantage for the use of all coating compositions of the prior art in UV-curable systems is the presence of low molecular mass UV initiators. Such low molecular mass UV initiators lead to fragments during the UV curing of the coating compositions, and these fragments lead in turn, firstly owing to the relatively high proportion of UV initiators in the coating composition, to notable losses of mass in the coating composition, and thus in the resulting coating, and, secondly, owing to the high volatility of the initiator fragments, lead to unwanted, strongly smelling and often toxic emissions in the course of curing of the coating compositions.

Copolymerizable UV initiators are known from the prior art with which it is possible to prevent the occurrence of low molecular mass initiator fragments. Included in the class of such copolymerizable UV initiators are benzophenonetetracarboxylic acid, its dianhydride and its esters, as are employed, for example, for heat-resistant photoresist materials as described, for example, in EP-A-0 379 377.

U.S. Pat. No. 4,100,047 embraces aqueous, UV-curable coating compositions comprising a hydroxy-functional ethylenically unsaturated polymer, for example an ether of polyethylene glycol and hydroxyethyl acrylate, benzophenonetetracarboxylic dianhydride as photo-initiator, which is attached to the hydroxy-functional ethylenically unsaturated polymer, and a further low molecular mass photoinitiator. The coatings prepared with coating compositions according to U.S. Pat. No. 4,100,047 can be cured in air at an intensity of irradiation of 2200 W/inch at belt speeds of about 3 m/min. A disadvantage of the coating compositions according to U.S. Pat. No. 4,100,047 is the high intensities of irradiation required at comparatively low curing rates.

U.S. Pat. No. 4,216,306 claims coating compositions comprising a polymeric adduct of diglycidyl ether, acrylic acid and benzophenonetetracarboxylic dianhydride, and a low molecular mass photoinitiator. Here too a disadvantage is the appearance of low molecular mass, volatile fragments which originate from the decomposition of the initiator. Furthermore, coatings prepared with coating compositions according to U.S. Pat. No. 4,216,306 must be cured in 3 passes at belt speeds of about 10 m/min, which points in turn to a comparatively low curing rate.

Finally, U.S. Pat. No. 4,338,171 describes coating compositions consisting of mixtures of monomeric ethylenically unsaturated compounds, for example trimethylolpropane triacrylate, and benzophenonetetracarboxylic diesters or tetraesters as photo-initiators, which, although they are highly reactive and can be cured at belt speeds of about 30 m/min, have the disadvantage of the high volatility of the monomeric component which makes up the predominant proportion of the coating composition and the high proportion of photoinitiator which is necessary.

SUMMARY OF THE INVENTION

The object of the present invention was therefore to provide binders for coating compositions which on the one hand have the advantages, known from the as yet unpublished German Patent Application 195 45 123.6, of the coating compositions described therein, such as adequate storage stability, homogeneity, absence of reactive diluents and the good properties of coating films produced from the coating compositions, especially the hardness of the film, combined on the other hand with a high curing rate and the avoidance of the liberation of volatile constituents in the course of curing of the coating compositions.

The object on which the present invention is based is achieved by a radiation-curable binder BM, consisting of a copolymer of from 80 to 99% by weight, preferably from 85 to 98% by weight, of a hydroxyl-containing polyether acrylate and/or polyester acrylate as component A), which optionally contains a mono-, di- and/or polyamine as adduct AA), and of from 1 to 20% by weight, preferably from 2 to 15% by weight, of benzophenonetetracarboxylic acid, its anhydrides and/or its esters as component B), and by radiation-curable coating compositions containing the binder BM.

Radiation-curable coating compositions of this kind preferably comprise:

from 20 to 100% by weight, preferably from 30 to 80% by weight, of the novel binder BM, mixed if desired with further photo-polymerizable, polymeric binder, from 0 to 40% by weight, preferably from 0 to 30% by weight, of water as component C), from 0 to 50% by weight, preferably from 0 to 30% by weight, of fillers as component D), from 0 to 10% by weight, preferably from 0.5 to 10% by weight, of further mono-, di- and/or polyamine AA) as component E), from 0 to 20% by weight, preferably from 0 to 10% by weight, of low molecular mass, copolymerizable compounds as component F), and from 0 to 30% by weight, preferably from 0 to 20% by weight, of customary auxiliaries and additives as component G), the sum of the proportions of the binder BM and of components C) to G) making up 100% by weight of the coating composition.

In other preferred embodiments of the invention component A) is a polyether acrylate and/or polyester acrylate having at least two acrylate and/or methacrylate groups per molecule and the mono-, di- and/or polyamines AA) optionally present are preferably diamines having one primary and one tertiary amino group, and with very particular preference the ratio of primary amino groups of the mono-, di- and/or polyamines AA) to (meth)acrylic double bonds of the polyether acrylate A) is from 0.01:1 to 0.2:1, preferably from 0.03:1 to 0.1:1.

Implementation of the Invention

In a preferred form of the invention the polyether (meth)acrylates and/or the polyester (meth)acrylates have at least two acrylate and/or methacrylate groups per molecule.

In accordance with the invention it is particularly preferred to employ, as component A), hydroxyl-containing polyether acrylates and/or polyether methacrylates as described, in particular, in the as yet unpublished German Patent Application P 195 35 936.4. Suitable acrylates and/or methacrylates A) are synthesized, for example, with dihydric aliphatic alcohols, such as ethylene glycol, propylene 1,2- and 1,3-glycol, butane-1,4-diol, pentane-1,2-diol, neopentylglycol, hexane-1,6-diol, 2-methylpentane-1,5-diol, 2-ethylbutane-1,4-diol, dimethylolcyclohexane and diethylene glycol, with trihydric alcohols, such as glycerol, trimethylolethane, trimethylolpropane and trimethylolbutane, with tetrahydric alcohols, such as pentaerythritol, and with higher polyhydric alcohols, such as di(trimethylolpropane), di(pentaerythritol) and sorbitol.

Also suitable are cycloaliphatic alcohols, such as cyclohexanediols and 1,4-bis-(hydroxymethyl)cyclcexane, araliphatic alcohols, such as 1,3-xylylenediol, and also phenols, such as 2,2-bis-(4-hydroxyphenyl)propane (bisphenol A).

The hydroxyl-containing polyethers A) which are esterified with acrylic acid and/or methacrylic acid are obtained by reacting the abovementioned di- and/or polyhydric alcohols with different quantities of ethylene oxide and/or propylene oxide by well-known methods (cf. e.g. Houben-Weyl, Volume XIV, 2, Makro-molekulare Stoffe [Macromolecular Substances] II, (1963)).

Particular preference is given to polyether acrylates A) which are prepared from (meth)acrylic acid and a propoxylated trimethylolpropane polyol. It is also possible to employ polymerization products of tetrahydrofuran or butylene oxide.

Also suitable as component A) are hydroxyl-containing polyester acrylates and/or polyester methacrylates. Polyhydric alcohols employed for preparing the polyester (meth)acrylates A) are hydroxyl-containing polyesters (polyesterpolyols). These can be prepared by esterifying dicarboxylic acids with diols and triols by well-known methods (cf. e.g. P. J. Flory, J. Am. Chem. Soc. 58, 1877 (1936) and J. Am. Chem. Soc. 63, 3083 (1953)). The preparation of hydroxyl-containing polyether acrylates and polyester acrylates A) is also described, for example, in DE-A-38 36 370.

The mono-, di- and/or polyamines AA) preferably have a primary amino group, for example aliphatic or cycloaliphatic mono-, di- and/or polyamines, for example monoalkylamines, monoalkanolamines, N,N-dialkylalkylenediamines or N,N-dialkyldialkylenetriamines. With particular preference the diamines AA) possess one primary and one tertiary amino group, the ratio of primary amino groups to (meth)acrylic double bonds preferably being between 0.01:1 and 0.2:1, very particularly preferably between 0.03:1 and 0.1:1. Suitable diamines AA) having one primary and one tertiary amino group are preferably N,N-dialkyl-diamino-alkanes, such as, with particular preference, N,N-dimethyl-1,3-diaminopropane, which is obtainable by catalytic hydrogenation of dimethylaminopropionitrile. The preparation of this diamine AA) is described, for example, in Houben-Weyl, Vol 11/1, 1957, page 565, in EP-A-0 316 761 or in P. Lappe, H. Springer and J. Weber, Chem.-Ztg. 111(4), pages 117 to 125 (1987). Other suitable dialkylaminopropanes AA) are N,N-diethyl-1,3-diaminopropane, N,N-di-n-propyl-1,3-diaminopropane, 4-morpholinopropylamine, 3(N-piperidinyl)propylamine or N,N-diphenyl-1,3-diaminopropane. Also suitable as component AA) of the novel addition products are: N,N-dialkyl-1,2-diaminoethanes, such as dimethylaminoethylamine, diethylaminoethylamine, N-β-aminoethyl-morpholine (for preparation see, for example, Houben Weyl, Vol. 11/1, 1957, page 563), N,N-dialkyl-1,5-diaminopentanes, which can be prepared by 1,4-addition of secondary amines onto 1-cyanobuta-1,3-diene with formation of the nitrites and subsequent catalytic hydrogenation (for preparation see Houben-Weyl, Vol. 11/1, 1957, p. 276). Examples of suitable N,N-dialkyl-1,5-diaminopentanes are: dimethylaminopentylamine, diethylaminopentylamine, 4-morpholinepentylamine. Particularly good results are obtained if N,N-dimethyl-1,3-diaminopropane is used as amine component AA).

The amine adduct of the polyether acrylate and/or of the polyester acrylate is prepared by adding the mono-, di- and/or polyamines AA) onto an acrylate or methacrylate A) or onto a mixture of these esters A) in a Michael reaction. The amine-modified (meth)acrylates A) obtained by such means contain still unreacted acrylate and/or methacrylate groups and also tertiary amino groups.

The addition reaction is carried out in liquid phase at moderate temperature in the absence of a catalyst. The mono-, di- and/or polyamine AA) is added in an appropriate quantity to the ester A) at room temperature with stirring. This addition may involve a rise in temperature to about 40 degrees C. By raising the temperature the reaction can be accelerated; at 60 degrees C. it has subsided after about 12 hours. At this point the viscosity of the resulting mixture is constant over time.

On account of reproducibility the reaction should proceed as completely as possible, which is achieved at reaction temperatures of more than 40 degrees C.

The reaction is generally carried out without solvents, although solvents can also be employed, in particular in order to meter in solid amines in solution form. In this case the solvent is removed after Michael addition has taken place.

So that no unwanted polymerization takes place during the addition reaction, polymerization inhibitors are generally added to the reaction mixture. Suitable polymerization inhibitors include products known per se, for example substituted phenols, such as 2,6-di-tert-butyl-p-cresol, hydroquinones, such as methylhydroquinones, and thioethers, such as thiodiglycol or phenothiazine.

As comonomer constituent B) of the novel binder BM, benzophenonetetracarboxylic acid, its anhydrides and/or its esters are employed. Component B) reacts in the course of the reaction with free hydroxyl groups of component A) to form the corresponding esters of benzophenonetetracarboxylic acid. Esterification catalysts customary per se are added if desired. In the radiation curing of the coating compositions containing the binder BM, the benzophenone groups act in a manner known per se as photoinitiators, without the addition of other low molecular mass photoinitiators being necessary.

A list of possible examples of component B) in addition to the already mentioned benzophenonetetracarboxylic acid is as follows: benzophenonetetracarboxylic monoesters, such as benzophenonetetracarboxylic monoalkyl esters, benzophenonetetracarboxylic diesters, such as benzophenonetetracarboxylic dialkyl esters, benzophenonetetracarboxylic triesters, such as benzophenonetetracarboxylic trialkyl esters, benzophenonetetracarboxylic tetraesters, such as benzophenonetetracarboxylic tetra-alkyl esters, benzophenonetetracarboxylic monoanhydride, whose remaining carboxylic acid groups are, if desired, completely or partly esterified, and, preferably, benzophenonetetracarboxylic dianhydride.

In a preferred embodiment of the invention the binder BM is prepared in a multistage process comprising the following stages:

I. the reaction of component A) with the mono-, di- and/or polyamine AA) in the addition reaction already described, II. the reaction of the addition product prepared in stage I. with component B) by esterifying component B) with the free hydroxyl groups of component A) at reaction temperatures customary for the esterification, with or without the use of esterification catalysts which are customary per se, and, if desired, III. the concluding reaction of the binder prepared in stage II. with further mono-, di- and/or polyamine AA) as component E) in order to adjust the reactivity and viscosity of the coating composition, in which case the reaction conditions already listed, which are relevant for the addition reaction, once again prevail.

In a further embodiment of the invention the binder BM is prepared in a multistage process comprising the following stages:

I. the reaction of component A) with component B) by esterifying component B) with the free hydroxyl groups of component A) at reaction temperatures customary for the esterification and with or without the use of esterification catalysts which are customary per se, and II. the concluding reaction of the binder prepared in stage I. with the mono-, di- and/or polyamine AA) as component E) for adduct formation and for adjusting the reactivity and viscosity of the coating composition, in which case the reaction conditions which are relevant for the addition reaction prevail.

In both process variants the viscosity and reactivity can be adjusted within certain limits prior to the application by simple addition of the mono-, di- and/or polyamine AA) as component E). If about 48 hours pass between the addition of component E) and the application of the coating composition, then the amine is no longer present in free form but is chemically or physically bonded to the other constituents of the coating composition. In this case the reactivity of the mixture formed with addition of amine rises relative to the basic formulation described above. Experiments have shown that under UV radiation, depending on quantity, an approximately doubled reaction rate is recorded. Likewise, the viscosity can be virtually doubled. Component E) is preferably added in quantities of from 0.5 to 10% by weight, particularly preferably in quantities of from 1 to 5% by weight, based on the coating composition.

The novel binders BM are liquid at room temperature and are used as film-forming components in the novel radiation-curable coating compositions. The advantage of the binders BM preferred in accordance with the invention can also be seen, in particular, in the fact that, owing to the free acid groups of component B) which are present in said binders or are formed in the aqueous medium, the binders BM are dispersible in water or, following neutralization of the free acid groups with the amine component AA), may even be soluble, so that it is possible to dispense entirely with the use of organic solvents in the novel coating compositions.

In addition to the novel binders BM, the radiation-curable coating compositions can also contain other binders customary in radiation-curable coating materials. Preferably, the novel radiation-curable coating compositions can contain, in addition to the binders BM, other photopolymerizable binders, which may likewise be amine-modified, in proportions of up to 50% by weight, based on the binder BM. Examples of suitable other amine-modified binders are the radiation-curable binders known from EP-A-0 280 222 and those known from U.S. Pat. Nos. 4,045,416, 4,547,562 and 4,675,374.

Suitable non-amine-modified other photopolymerizable binders are the polyether acrylates, polyether methacrylates, polyester acrylates or polyester methacrylates described above as example of component A), and also urethane acrylates, urethane methacrylates, epoxide acrylates and epoxide methacrylates, with it being possible for the latter urethane (meth)acrylates and epoxide (meth)acrylates to likewise contain the novel component B) as polymer constituent.

Suitable filler components D) in the novel coating compositions are silicates, such as, in particular, kaolins, talc, siliceous chalk, mica, for example micaceous iron ore, silicon carbeet [sic] and quartz flour, carbonates, such as, for example, calcium carbonates and calcium-magnesium carbonates (dolomite) and sulfates, such as, for example, barium sulfates (heavy spar) or potassium sulfates (light spar). In addition to the substances mentioned it is also possible to use wood flour and cellulose derivatives as fillers D).

Other suitable fillers D) include color-imparting substances. These include both inorganic pigments, for example carbon black, $TiO_2$, and organic pigments. The filler contents of the novel coating compositions can be from 0 to 50% by weight, preferably from 0 to 30% by weight, based on the coating composition. In this context it is surprising that in a range of more than 15% by weight filler proportion there are no losses in adhesion. Furthermore, the novel coating compositions exhibit no irreversible settling tendency whatsoever.

In minor quantities of from 0 to 20% by weight, preferably from 0 to 10% by weight, based on the coating composition, it is possible for the coating composition, depending on the viscosity of the esters A), to contain as component F) further low molecular mass copolymerizable compounds which are known for use in radiation-curable coating compositions, such as, for example, (meth)acrylates, especially methyl (meth)acrylate, ethyl (meth)acrylate, propyl (meth)acrylate, butyl (meth)acrylate, isopropyl (meth) acrylate, isobutyl (meth)acrylate, pentyl (meth)acrylate, isoamyl (meth)acrylate, hexyl (meth)acrylate, cyclohexyl (meth)acrylate, 2-ethylhexyl (meth)acrylate, octyl (meth) acrylate, 3,5,5-trimethylhexyl (meth)acrylate, decyl (meth) acrylate, dodecyl (meth)acrylate, hexadecyl (meth)acrylate, octadecyl (meth)acrylate, octadecanyl (meth)acrylate and the corresponding esters of maleic, fumaric, tetrahydrophthalic, crotonic, isocrotonic, vinylacetic and itaconic acid. Preference is given to the use of monomers having more than one double bond per molecule, for example ethylene glycol diacrylate, diethylene glycol diacrylate, propylene glycol diacrylate, trimethylene glycol diacrylate, neopentylglycol diacrylate, 1,3-butylene glycol diacrylate, 1,4-butylene glycol diacrylate, 1,6-hexamethylene glycol diacrylate, 1,10-decamethylene glycol diacrylate, trimethylolpropane triacrylate, pentaerythritol tetraacrylate and pentaerythritol triacrylate, and also the corresponding methacrylates. Very particular preference is given to the use of trimethylolpropane triacrylate and acrylates of propoxylated trimethylolpropane.

The addition of these monomeric, copolymerizable compounds (often called reactive diluents as well), however, is in general unnecessary since the novel binders BM permit sufficiently low-viscosity coating compositions even without these reactive diluents.

The novel radiation-curable coating compositions contain as component G), in quantities of from 0 to 30% by weight, preferably from 0 to 20% by weight, based on the coating composition, additives and auxiliaries which are customary per se, for example extenders, antifoams, leveling agents and film-forming auxiliaries, lubricants or adhesion promoters. The lubricants, for example, can be present in the coating composition in a proportion of from 0.8 to 1.2% by weight and the leveling agents in a proportion of from 0.2 to 0.8% by weight.

In a preferred embodiment of the invention, therefore, the coating composition is composed of:

from 20 to 100% by weight, preferably from 30 to 80% by weight of the novel binder BM, mixed if desired with further photopolymerizable, polymeric binder, from 0 to 40% by weight, preferably from 0 to 30% by weight, of water as component C), from 0 to 50% by weight, preferably from 0 to 30% by weight, of component D), from 0 to 10% by weight, preferably from 0.5 to 10% by weight, of further mono-, di- and/or polyamine as component E), from 0 to 20% by weight, preferably from 0 to 10% by weight, of component F), and from 0 to 30% by weight, preferably from 0 to 20% by weight, of component G), the sum of the proportions of the binder BM and of components C) to G) making up 100% by weight of the coating composition.

Advantageous properties of the coating compositions are the good sandability and very good adhesion even on difficult substrates, for example plastics or wooden materials coated with melamine resins, without any need for the use of typical adhesion promoters. In specific cases, however, additional adhesion promoters can be employed. Examples are alkoxysilanes, for example N-β-aminoethyltrimethoxysilane, N-methyl-β-aminopropyltrimethoxysilane or triamino-modified propyltrimethoxysilane (e.g. adhesion promoter DYNASLYAN [sic]®, type TRIAMO, commercial product of Dynamit Nobel Chemie).

The curing of the coating films takes place directly after application or after the evaporation of any water present, by means of UV rays or electron beams. The equipment and conditions for these curing methods are known from the literature (cf. e.g. R. Holmes, U. V. and E. B. Curing Formulations for Printing Inks, Coatings and Paints, SITA-Technology, Academic Press, London, United Kingdom 1984, pp. 79 to 111) and require no further description.

The coating compositions can be applied to the substrate, preferably to wood, to wooden materials or to paper, by spraying, rolling, flow coating, dipping, knife coating, brushing, pouring or by vacumat application.

The novel radiation-curable coating compositions exhibit excellent storage stability, have a transparent appearance, good radiation-curability, and following radiation curing lead to films having excellent properties. The films obtained are distinguished by outstanding transparency if no fillers are present in the coating composition.

The invention is illustrated in more detail below with reference to working examples. Parts are by weight unless specified otherwise.

EXAMPLES

Example 1

Preparation of the Binder BM1 and of a Coating Composition 2.0 parts of 3-dimethylaminopropylamine in order to produce water-dispersibility of the binder are stirred at 60 degrees C. for 1 hour into 90.0 parts of a polyether acrylate prepared from propoxylated trimethylolpropane (polyol PP150® from Perstorp) . In a second step thereafter, 8.0 parts of benzophenonetetracarboxylic anhydride as copolymerizable photoinitiator are stirred in at 80 degrees C. for 3 hours and are reacted with the free hydroxyl groups of the polyether acrylate. In a concluding step, 2.0 parts of dibutylamine are also added at 60 degrees C. for 1 hour in order to adjust the viscosity and the reactivity of the binder. The viscosity of the binder BM1 prepared in this way is 27.6 dPas at 40 degrees C.

A coating composition consisting of 100% by weight of the binder BM1 cures fully without further additives under UV radiation, in which context it is possible to realize a belt speed of 20 m/min under an 80 W source with a single pass.

Example 2

Preparation of Another Coating Composition Based on the Binder BM1

Another coating composition is prepared from 60.0 parts of the binder BM1 as in Example 1 and 40.0 parts of a commercial polyether acrylate (Laromer® PO 83F from BASF AG).

The coating composition cures without further additives under UV radiation, it being possible to realize a belt speed of 10 m/min under an 80 W source with a single pass.

What is claimed is:

1. A radiation-curable binder BM consisting of a copolymer composed of:
   from 80 to 99% by weight, based on the binder BM, of a component A) comprising an adduct of at least one hydroxyl-containing (meth)acrylate selected from the group consisting of hydroxyl-containing polyether (meth)acrylates, hydroxyl-containing polyester (meth) acrylates, and mixtures thereof and at least one amine AA selected from the group consisting of monoamines, diamines, polyamines, and combinations thereof; and
   from 1 to 20% by weight, based on the binder BM, of a component B) selected from the group consisting of benzophenonetetracarboxylic acid, its anhydrides, its esters, and mixtures thereof.

2. The radiation-curable binder BM of claim 1, wherein component A) contains at least two acrylate and/or methacrylate groups per molecule.

3. The radiation-curable binder BM of claim 1, wherein component A) consists of polyether (meth)acrylate.

4. The radiation-curable binder BM of claim 3, wherein component A) is prepared by esterification from (meth) acrylic acid and alkoxylated polyol which is obtained by reacting an alcohol selected from the group consisting of dihydric alcohols, polyhydric alcohols, and mixtures thereof with an alkylene oxide selected from the group consisting of ethylene oxide, propylene oxide, and mixtures thereof.

5. The radiation-curable binder BM of claim 1, wherein amine component AA) is a diamine having one primary and one tertiary amino group and wherein the ratio of primary amino groups of the amine component AA) to (meth)acrylic double bonds of the hydroxyl-containing (meth)acrylate is from 0.01:1 to 0.2:1.

6. The radiation-curable binder BM of claim 5, wherein the ratio of primary amino groups of the amine component AA) to (meth)acrylic double bonds of the hydroxyl-containing (meth)acrylate is from 0.03:1 to 0.1:1.

7. The radiation-curable binder BM of claim 1, wherein amine component AA) is N,N-dimethyl-1,3-diaminopropane.

8. The radiation-curable binder BM of claim 1, wherein component B) comprises the dianhydride of benzophenonetetracarboxylic acid.

9. The radiation-curable binder BM of claim 1 comprising from 85 to 98% by weight, based on the binder BM, of component A) and
from 2 to 15% by weight, based on the binder BM, of a component B).

10. A process for the preparation of the radiation-curable binder BM of claim 1, comprising the following stages:
   I. reacting component A) with the amine AA) to provide an addition product prepared in stage I,
   II. reacting the addition product of stage I with component B) by esterifying component B) with the free hydroxyl groups of component A) to provide a binder prepared in stage II.

11. A process for the preparation of the radiation-curable binder according to claim 10, further comprising reacting the binder of stage II with further amine AA).

12. A process for the preparation of the radiation-curable binder BM of claim 1, comprising the following stages:
   I. reacting component A) with component B) by esterifying component B) with the free hydroxyl groups of component A) to provide a binder prepared in stage I, and
   II. reacting the binder prepared in stage I with the amine AA).

13. A radiation-curable coating composition comprising:
   from 20 to 100% by weight of the binder BM of claim 1, optionally mixed with further photo-polymerizable, polymeric binder,
   from 0 to 40% by weight of water as component C),
   from 0 to 50% by weight of fillers as component D),
   from 0 to 10% by weight of further amine AA) as component E),
   from 0 to 20% by weight of low molecular mass, copolymerizable compounds as component F), and
   from 0 to 30% by weight of customary auxiliaries and additives as component G),
   the sum of the proportions of the binder BM and of components C) to G) making up 100% by weight of the coating composition.

14. The radiation-curable coating composition of claim 13 comprising:
   from 30 to 80% by weight, of the binder BM of claim 1, optionally mixed with further photo-polymerizable, polymeric binder,
   from 0 to 30% by weight, of water as component C),
   from 0 to 30% by weight, of fillers as component D),
   from 0.5 to 10% by weight, of further amine AA) as component E),
   from 0 to 10% by weight, of low molecular mass, copolymerizable compounds as component F), and
   from 0 to 20% by weight, of customary auxiliaries and additives as component G),
   the sum of the proportions of the binder BM and of components C) to G) making up 100% by weight of the coating composition.

15. A process for coating a substrate, comprising
   applying the radiation-curable coating composition of claim 13 to said substrate; and
   exposing the coating composition on the substrate to radiation.

16. A process for coating a substrate according to claim 15, wherein said substrate is selected from the group consisting of wood, wooden materials, glass, paper, plastics, and combinations thereof.

* * * * *